Inventor:
Eberhard Winkler
Rudolf Dörler
By: Spencer & Kaye
Attorneys

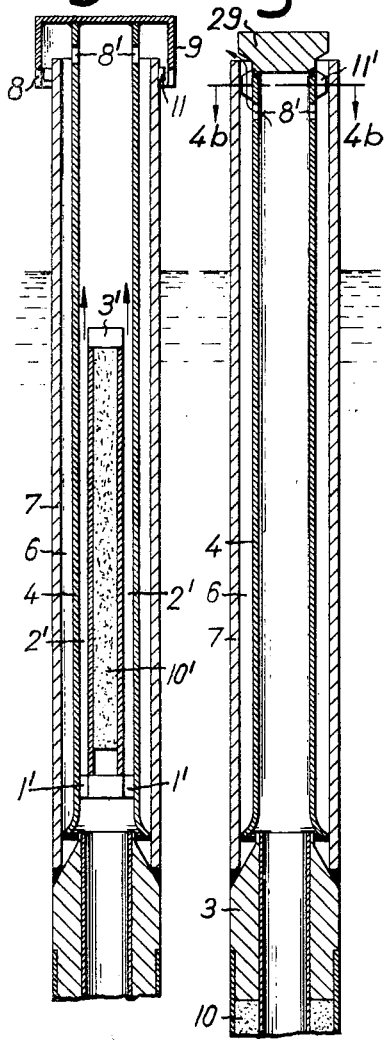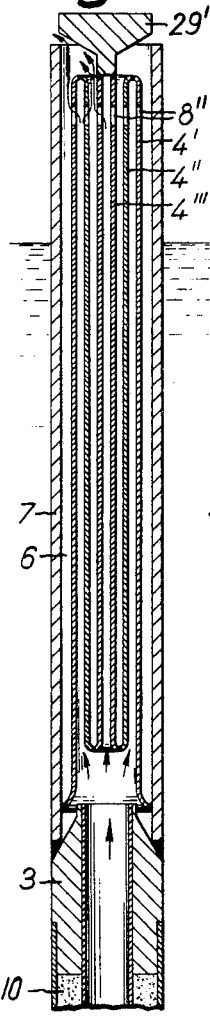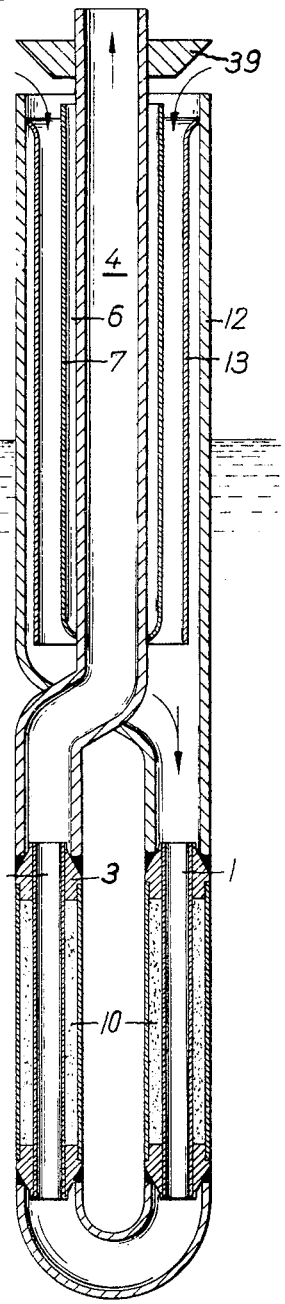

United States Patent Office 3,510,396
Patented May 5, 1970

3,510,396
FLOW CONTROL ARRANGEMENT IN A NUCLEAR REACTOR
Eberhard Winkler, Sprendlingen, Hess, and Rudolf Dörler, Frankfurt am Main, Germany, assignors to Licentia-Patent-Verwaltungs-G.m.b.H., Frankfurt am Main, Germany
Filed Feb. 17, 1966, Ser. No. 528,131
Claims priority, application Germany, Feb. 17, 1965,
L 49,981
Int. Cl. G21c 7/32
U.S. Cl. 176—61                    9 Claims

ABSTRACT OF THE DISCLOSURE

The flow rate of a primary coolant through the fuel elements of a nuclear reactor is automatically controlled by a simple thermostatic control tube to minimize variations of temperature within the nuclear reactor. The thermostatic control tube acts as a conduit for the primary coolant and, by virtue of its temperature expansions and contractions, it also varies the coolant outlet area and thereby varies the flow rate of the coolant as a function of the coolant temperature.

---

The present invention relates to the field of flow control, and particularly to the control of the rate of flow of a primary coolant through a fuel element of the type used in a nuclear reactor.

It is known that a device of the nuclear reactor type develops a greater amount of heat at its center than in its peripheral zones. Furthermore, zones of varying temperature may develop in such a reactor due to the particular vertical position of the damper rods. If no measures were taken to reduce the resulting temperature differences, which may amount in some cases to several hundred degrees centigrade in the case of steam cooling, a reduced output from the reactor will result because, on the one hand, the temperature of the fuel element jackets must not exceed a specific level and, on the other hand, the maximum reactor efficiency is determined by the temperature of the hottest region of the reactor. In addition, it is desirable to prevent the occurrence of these temperature variations in order to cause all of the fuel elements, which are generally all constructed to have the same thermal characteristics, to be maintained at the same temperature.

One technique is already known for reducing these temperature variations by causing the vapor constituting the primary coolant to flow past each fuel element a plurality of times and by mixing the hotter and cooler masses of vapor together prior to each successive flow past the fuel elements. However, this technique is rather expensive to employ because it requires the provision of additional vapor mixers.

It is a primary object of the present invention to eliminate these drawbacks.

A more specific object of the present invention is to substantially reduce temperature variations in a reactor.

Another object of the present invention is to produce such a result with the aid of simple and inexpensive devices.

Still another object of the present invention is to control the rate of flow of cooling fluid through each fuel element of a reactor as a function of the temperature of the primary coolant leaving the fuel element.

Yet another object of the present invention is to increase the maximum thermal efficiency of a reactor by creating a uniform temperature in all of the reactor regions.

The present invention particularly concerns apparatus for controlling the flow rate of a primary coolant flowing in heat-exchange relationship with a fuel element of a device of the nuclear reactor type. In accordance with the present invention, the apparatus includes control means connected at least to the outlet side of the coolant flow channel associated with such fuel element, this control means including a thermostatic control body positioned to be maintained at the temperature of the coolant medium flowing from the outlet side of such channel, and a control member mounted to be moved by the control body for regulating the flow rate of such coolant.

Additional objects and advantages of the present invention will become apparent upon consideration of the following description when taken in conjuction with the accompanying drawings in which:

FIG. 2b is a cross-sectional view taken along the plane defined by the line 2b—2b of FIG. 2a.

FIG. 3 is an elevational, cross-sectional view of yet another embodiment of the present invention.

FIG. 4a is an elevational, cross-sectional view of still another embodiment of the present invention.

FIG. 4b is a cross-sectional view taken along the plane defined by the line 4b—4b of FIG. 4a.

FIG. 5 is an elevational, cross-sectional view of a still further embodiment of the present invention.

FIG. 6 is an elevational, cross-sectional view of yet a further embodiment of the present invention.

Figure 1:
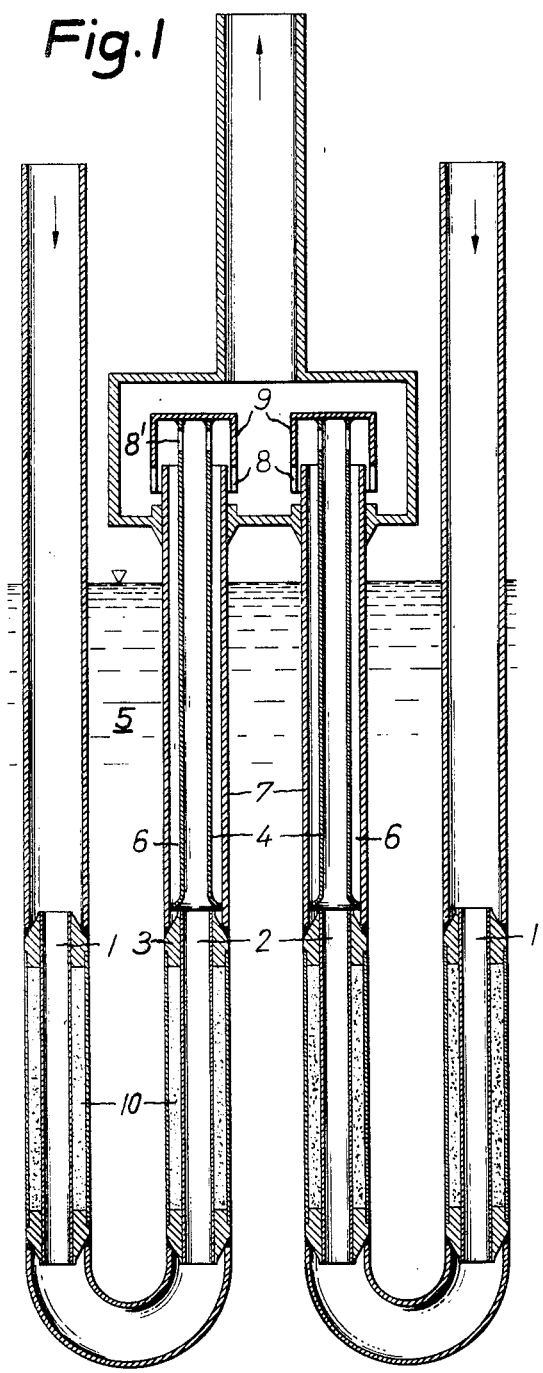
FIG. 1 is an elevational, cross-sectional view showing one embodiment of the present invention.

Referring now specifically to FIG. 1, there is shown an arrangement for passing a primary coolant, which is preferably originally in the form of a saturated vapor, through a first tubular fuel element 10 in the direction of the arrows. The medium enters the first element 10 in the region 1 and passes completely through the element. It is then deflected through a second tubular fuel element 10 leaving this element at the region 2. During its travel through the fuel elements, the coolant may have become heated to a temperature of the order of 500° C., for example, and is in the form of superheated steam. Then, the coolant passes through the end piece 3 of the second fuel element and into the control tube 4. This control tube is enclosed by an insulating tube 7 which is separated from the control tube 4 by an annular insulating space 6 which thermally insulates the control tube 4 from the mass of boiling water serving as a moderator and cooling liquid. The water 5 is preferably maintained at a temperature of approximately 280° C. The space 6 is preferably filled with a trapped mass of the primary coolant medium. The control tube 4 is made of a material having a relatively large coefficient of heat expansion and has a length of several meters. Control tube 4 has its outlet end provided with a plurality of openings 8' and covered by a lid 9 in which are disposed outlet openings 8, the lid 9 being so arranged that its longitudinal displacement from the upper end of insulating tube 7 determines the effective cross-sectional area of the outlet flow passage presented to the coolant flowing through the openings 8.

In operation, the length of tube 4, and thence the longitudinal distance separating the lid 9 from the upper end of insulating tube 7, is determined by the average temperature of the thermally expansible control tube 4, this temperature being substantially equal to the temperature of the coolant exiting from the region 2 of the second fuel element 10 which it traverses. For this purpose, the control tube 4 may be made of a material such as austenitic steel, which material has a favorable coefficient of heat expansion for use in embodiments of the present invention.

If the two fuel elements forming a part of one coolant flow path are producing a relatively small amount of heat, the coolant must be given a lower flow rate through these fuel elements in order to be heated to the desired temperature. This result is achieved, according to the present invention, by the contraction of the control tube 4 when it is traversed by coolant having a relatively low temperature, this contraction causing the lid 9 to move toward the upper end of insulating tube 7 in order to reduce the effective cross-sectional area presented for the outflow of the coolant through the openings 8. This reduction in the cross-sectional area of the outflow passage automatically reduces the flow rate of coolant through the fuel elements, permitting the coolant to be heated to the desired temperature during its pasage through these elements. Conversely, if the coolant is being heated to a higher temperature than desired, the control tube 4 expands, increasing the cross-sectional area of the outlet flow passage presented for the coolant, causing the coolant to have a higher flow rate through the fuel elements and thus to attain a lower temperature.

In the embodiment of FIG. 1, the lid 9 is mounted on the control tube 4 in such a manner that the cylindrical, downwardly-projecting skirt of lid 9 is guided around the upper end of insulating tube 7. This skirt is preferably spaced a small distance away from insulating tube 7 so that a small flow of coolant will continue to take place even when this coolant is at such a low temperature that the control tube 4 is contracted to its minimum length.

Figure 2A:
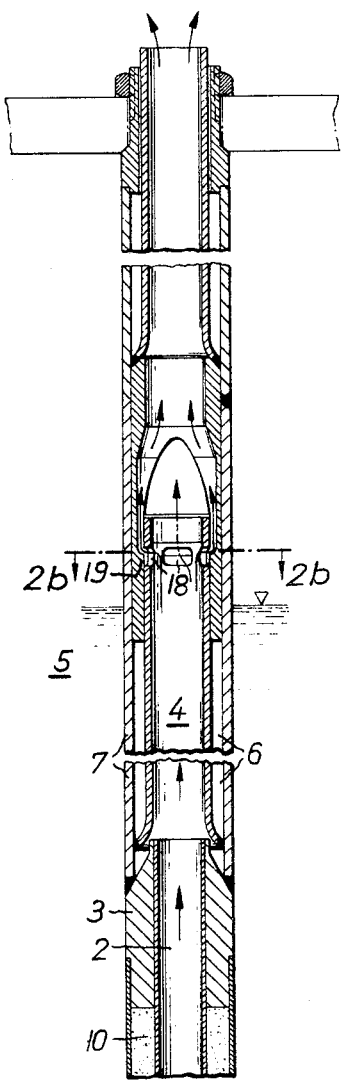
FIG. 2a is a elevational, cross-sectional view of another embodiment of the present invention.
Figure 2B:
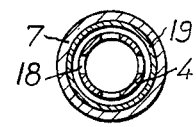

Turning now to FIG. 2, there is shown in greater detail another embodiment of the present invention. In this embodiment, the control tube 4, which is attached at its lower end to the insulating tube 7, is provided with openings 18 which constitute the outlet flow passages for the coolant exiting from the region 2 of fuel element 10 and traversing the length of control tube 4. The insulating tube 7 is provided with a cylindrical member 19 in which the upper end of tube 4 is slidably disposed. This cylindrical member acts to guide the control tube 4 and also includes a portion which cooperates with the openings 18 to cause the cross-sectional area of the coolant outlet flow passage to vary in accordance with the degree of expansion of control tube 4. The upper end of control tube 4 is dimensioned so that even when the tube 4 is contracted to its minimum length a small flow passage for the coolant exists between member 19 and the control tube. The insulating tube 7 is mounted on the end piece 3 of fuel element 10. The operation of the arrangement of FIG. 2 is identical with that set forth above in connection with the embodiment of FIG. 1.

Referring now to FIG. 3, there is shown yet another embodiment of the present invention which is adapted for use with a rod-shaped fuel element 10'. The lower end of control tube 4 is attached to the inner surface of insulating tube 7 and the fuel element 10' is disposed within the lower portion of control tube 4. The coolant enters the control tube in the annular region 1' and passes along the outer circumference of element 10' until passing through the annular region 2' disposed around the end piece 3' of element 10'. During this portion of its travel and the remaining portion thereof, the coolant remains in thermal contact with control tube 4 so that the control tube and the coolant always remain at substantially the same temperature. The coolant then flows out through the openings 8' and then through the openings 8 whose effective cross-sectional area is determined by the longitudinal position of lid 9 with respect to the upper end of tube 7, this position being determined by the temperature of control tube 4. Insulating tube 7 is provided with a spacer 11 which serves to maintain the skirt of lid 9 at the desired distance from tube 7.

In the preceding description it has been stated that the cross-sectional area of the coolant outlet flow passage is determined by the temperature of control tube 4. But it would be more accurate to state that the cross-sectional area of this passage is determined by the difference in temperature, and the difference in coefficient of expansion, between the tubes 4 and 7. However, because the amount of moderator liquid 5 present in the reactor is relatively large compared with that of the coolant and because this liquid 5 is effectively insulated from the fuel element by the annular space 6, the mass of liquid 5, and hence the insulating tube 7, remains at a relatively constant temperature. Moreover, the insulating tube 7 is preferably made of a material having a low coefficient of thermal expansion. Therefore, the length of tube 7 varies by a very small amount, if any, so that it would not be inaccurate to consider that the dimension of the flow passage is determined exclusively by the variations in length of the control tube 4.

Referring now to FIG. 4, there is shown another embodiment of the present invention which constitutes a modification of the arrangement shown in FIG. 2. In the embodiment of FIG. 4, the spacing of the control tube 4 from the insulating tube 7 is maintained by the spacers 11' which are disposed around the circumference of tube 4, as is shown in FIG. 4b. Control tube 4 is surrounded by a plug 29 which is moved by the contraction and expansion of tube 4 in order to vary the cross-sectional area of the coolant outlet passage, this outlet passage being defined by the opening between plug 29 and the upper end of tube 7.

FIG. 5 shows yet another embodiment of the present invention wherein the control tube is constituted by three coaxial tube portions 4', 4", and 4''' telescopically disposed one within the other and connected together at U-shaped joints. The lower end of the outermost tube portion 4' is connected to insulating tube 7, while the upper end of the innermost tube portion 4''' carries a plug 29' which cooperates with the upper end of insulating tube 7 to define the variable cross-section coolant outlet passage. Tube portions 4' and 4''' are made of a material having a high coefficient of thermal expansion and intermediate portion 4" is made of a material having a lower coefficient of expansion. Thus, for a given temperature variation, the total change in length between the lower end of tube portion 4' and the upper end of tube portion 4''' is considerably greater than that of a control tube having only a single portion. Each of the tube portions is provided with openings 8" for the exit of the coolant.

Referring now to FIG. 6, there is shown another embodiment of the present invention wherein the arrangement of conrol tube 4 and insulating tube 7 for the passage of the coolant leaving the fuel elements 10 is enclosed within an inlet tube 12 for supplying the coolant to the fuel elements. The upper portion of control tube 4 is provided with a plug 39 which cooperates with the upper end of tube 12 in order to regulate the coolant flow rate by varying the cross section of the coolant inlet passage rather than that of the outlet passage. In order to assure that the flow regulating effect of the arrangement will be as great as possible even if the coolant medium introduced at the inlet end of tube 12 has already been heated somewhat, the inlet tube 12 is thermally insulated from the coolant by means of a screening tube 13 which is disposed within tube 12. It thus results that the outer wall of tube 12 remains at the temperature of the surrounding medium while the control tube 4 obtains the temperature of the heated coolant exiting from the region 2 of the second fuel element 10. In order to avoid the occurrence of thermal stresses, the screening tube 13 is welded to the inlet tube 12 only at its upper end.

The arrangement shown in FIG. 6 operates according to the same principle as the previously-described arrangements except that in this case the temperature of the coolant leaving the fuel elements effects the cross-sectional area of the inlet passage to tube 12 rather than that of the outlet passage from tube 4.

What is claimed is:

1. Apparatus for controlling the flow rate of a primary coolant flowing through a flow channel in heat-exchange relationship with a fuel element of a device of the nuclear reactor type, comprising, in combination, control means for connection at least to the outlet side of the primary coolant flow channel associated with such a fuel element, said means including a thermally expansible control tube through which such coolant flows after moving out of contact with its associated fuel element, a control member mounted to vary the area of a coolant flow passage under the influence of the thermal expansion and contraction of said control tube for regulating the flow rate of such a coolant, and an insulating tube disposed concentrically around said control tube and separated therefrom by an annular space to be filled by a stagnant mass of the coolant for thermally insulating said control tube from the region surrounding it.

2. An arrangement as defined in claim 1 wherein said control member is mounted to vary the area of the coolant flow passage in proportion to the thermal differential expansion between said control tube and said insulating tube.

3. An arrangement as defined in claim 2 wherein said control tube is formed with a plurality of openings therein and said control member includes a control surface which is movable with respect to said openings for varying the area of said passage.

4. An arrangement as defined in claim 2 wherein said control member is constituted by a plug member mounted on the outlet end of said control tube.

5. An arrangement as defined in claim 1 wherein the coolant is in the form of water vapor which leaves the associated fuel element as superheated steam, and said control tube and insulating tube are arranged to permit a portion of this water vapor to enter, and to remain in, said space between said tubes, said insulating tube being maintained at the temperature of the region surrounding said apparatus.

6. An arrangement as defined in claim 1 wherein said control tube is composed of a plurality of partial tubes disposed coaxially one within the other and connected together in sequence with one end of each said partial tube being connected to one end of its adjacent partial tube and with alternate ones of said partial tubes having a high coefficient of thermal expansion and the remaining ones of said partial tubes having a low coefficient of thermal expansion.

7. An arrangement as defined in claim 1 further comprising a coolant inlet tube disposed coaxially around said insulating tube, and a screening tube disposed adjacent the inner wall of said inlet tube.

8. An arrangement as defined in claim 7 wherein said inlet tube is connected to supply coolant to the associated fuel element.

9. An arrangement as defined in claim 7 wherein said control member is mounted on said control tube and cooperates with the inlet end of said inlet tube for varying the cross-sectional area of said passage.

References Cited

UNITED STATES PATENTS

| 3,036,965 | 5/1962 | Braun | 176—56 |
| 3,172,819 | 3/1965 | Picton | 176—43 |
| 3,053,746 | 9/1962 | Challender et al. | 176—61 X |
| 3,208,913 | 9/1965 | Hennig | 176—61 X |

FOREIGN PATENTS

| 1,254,203 | 1/1961 | France. |

REUBEN EPSTEIN, Primary Examiner

U.S. Cl. X.R.

176—20, 43, 56